(12) United States Patent
Wang et al.

(10) Patent No.: US 11,518,294 B1
(45) Date of Patent: Dec. 6, 2022

(54) ELECTRIC LIFTING BED FOR AUTOMOBILE

(71) Applicant: Henghong Intelligent Equipment Co., Ltd., Hangzhou (CN)

(72) Inventors: Guozhong Wang, Hangzhou (CN); Yafeng Hu, Hangzhou (CN); Jiangqiang Lu, Hangzhou (CN); Ming Lu, Hangzhou (CN); Jinming Shi, Hangzhou (CN); Wenming Zhang, Hangzhou (CN); Lutao Bai, Hangzhou (CN); Yike Luo, Hangzhou (CN)

(73) Assignee: Henghong Intelligent Equipment Co., Ltd., Hangzhou (CN)

( * ) Notice: Subject to any disclaimer, the term of this patent is extended or adjusted under 35 U.S.C. 154(b) by 0 days.

(21) Appl. No.: 17/805,830

(22) Filed: Jun. 7, 2022

(30) Foreign Application Priority Data

Jan. 13, 2022 (CN) .......................... 202210036090.4

(51) Int. Cl.
*B60P 3/39* (2006.01)
*A47C 17/84* (2006.01)
*B60P 3/34* (2006.01)

(52) U.S. Cl.
CPC ................ *B60P 3/39* (2013.01); *A47C 17/84* (2013.01); *B60P 3/34* (2013.01)

(58) Field of Classification Search
CPC ............... B60P 3/39; B60P 3/34; A47C 17/84
See application file for complete search history.

(56) References Cited

U.S. PATENT DOCUMENTS

2004/0262946 A1 12/2004 Rasmussen
2006/0260044 A1* 11/2006 Nebel .................... A47C 19/20
5/118

(Continued)

FOREIGN PATENT DOCUMENTS

CN 203106476 U 8/2013
CN 107361999 A 11/2017

(Continued)

OTHER PUBLICATIONS

"Chinese Application No. 2022100360904, First Office Action dated Feb. 24, 2022", (dated Feb. 24, 2022), 7 pgs.

(Continued)

*Primary Examiner* — Joseph D. Pape
(74) *Attorney, Agent, or Firm* — Schwegman Lundberg & Woessner, P.A.

(57) ABSTRACT

An electric lifting bed is provided, it includes a frame, a controller, a lifting transmission mechanism, an electric transmission mechanism and a manual transmission mechanism. The electric transmission mechanism includes an electric lifting switch, a motor, a brake and an encoder, the brake is connected to an output shaft of the motor, the encoder is connected to the output shaft of the motor or the transmission rod, the motor is connected with the transmission rod, the electric lifting switch, the motor, the brake and the encoder are electrically connected with the controller respectively. The manual transmission mechanism includes a transmission box, a manual transmission assembly, a manual locking assembly and a manual switching assembly, the manual transmission assembly is connected with the transmission rod, the manual locking assembly is connected with the manual transmission assembly, and the manual switching assembly is connected with the manual locking assembly.

20 Claims, 4 Drawing Sheets

(56) References Cited

U.S. PATENT DOCUMENTS

| | | | |
|---|---|---|---|
| 2014/0159410 A1 | 6/2014 | Rasmussen | |
| 2015/0239387 A1* | 8/2015 | Marasco | B60P 3/39 296/156 |
| 2016/0332552 A1* | 11/2016 | Rasmussen | A47C 19/20 |
| 2019/0084469 A1 | 3/2019 | Rasmussen | |

FOREIGN PATENT DOCUMENTS

| | | | |
|---|---|---|---|
| CN | 107951254 A | 4/2018 | |
| EP | 2450233 A1 | 5/2012 | |
| EP | 3415366 A1 * | 12/2018 | A47C 17/80 |
| EP | 3936383 A1 * | 1/2022 | |

OTHER PUBLICATIONS

"Chinese Application No. 2022100360904, First Search dated Jan. 20, 2022", (dated Jan. 20, 2022), 2 pgs.

"Chinese Application No. 2022100360904, Notification to Grant Patent Right for Invention dated Mar. 23, 2022", (dated Mar. 23, 2022), 3 pgs.

"Chinese Application No. 2022100360904, Supplemental Search dated Mar. 9, 2022", (dated Mar. 9, 2022), 1 pg.

\* cited by examiner

ELECTRIC LIFTING BED FOR AUTOMOBILE

CROSS-REFERENCE TO RELATED APPLICATIONS

This Non-provisional application claims priority under 35 U.S.C. § 119(a) to Chinese Patent Application No. 202210036090.4, filed on 13 Jan. 2022, the entire contents of which are hereby incorporated by reference in its entirety.

TECHNICAL FIELD

The disclosure relates to a technical field of lifting beds, in particular to an electric lifting bed for an automobile.

BACKGROUND ART

Today, automobiles are closely related to people's lives. With improvement of people's living standards, automobiles have entered homes of ordinary people, and people's requirements for the automobiles are getting higher and higher. In order to improve comfort, some caravans or motor homes are usually equipped with lifting beds, which is a device of which a bed height can be adjusted. A position of a bed can be adjusted as desired to make a space layout more reasonable and compact, thus improving space utilization inside vehicles.

However, a brake mechanism of an existing electric lifting bed for an automobile adopts an one-way ratchet locking principle, which has following disadvantages: 1. A bed body can't be raised to a target height, and a lowering movement of the bed body can be made only after being raised by a distance; when the lifting bed is raised to a highest point for many times, an elastic piece of a travel switch will be deformed, resulting in a forcibly increased rising stroke, and thus a product failure; and noise from a locking mechanism will be clearly heard during an electric lifting process, and a lifting action is not smooth; 2. With an one-way ratchet locking structure, the electric lifting bed can only rise but not lower when it is operated manually, and after the electric lifting bed is subject to power loss, the bed body even can't be operated to a required height and can't be used normally.

SUMMARY

To solve the above problems, the technical scheme provided in the disclosure is as follows:

An electric lifting bed for an automobile includes a frame, a controller, a lifting transmission mechanism, an electric transmission mechanism and a manual transmission mechanism. The lifting transmission mechanism includes a transmission rod and a tape, the tape is connected with the transmission rod. The electric transmission mechanism includes an electric lifting switch, a motor, a brake and an encoder, the brake is connected to an output shaft of the motor, the encoder is connected to the output shaft of the motor or the transmission rod, the motor is connected with the transmission rod, the electric lifting switch, the motor, the brake and the encoder are electrically connected with the controller respectively. The manual transmission mechanism includes a transmission box, a manual transmission assembly, a manual locking assembly and a manual switching assembly, the manual transmission assembly is connected with the transmission rod, the manual locking assembly is connected with the manual transmission assembly, and the manual switching assembly is connected with the manual locking assembly.

According to the disclosure, the manual transmission assembly further includes a first bevel gear, a second bevel gear and a hand shaft. The first bevel gear is connected to the transmission rod, the hand shaft is connected to the transmission box, the second bevel gear is connected to the hand shaft, and the first bevel gear is meshed with the second bevel gear. With the second bevel gear being driven to rotate by the hand shaft, the second bevel gear and the first bevel gear cooperate to realize manual rotation of the transmission rod, so as to lift the bed.

According to the disclosure, the manual locking assembly further includes a ratchet, a rising pawl, a lowering pawl, a cam and a cam shaft. The ratchet is connected to the hand shaft, the cam shaft, the rising pawl and the lowering pawl are respectively connected to the transmission box, the cam is connected to the cam shaft, the rising pawl and the lowering pawl are respectively oppositely arranged at two sides of the cam; and the cam includes a first inclined face and a second inclined face, the first inclined face is arranged proximate to the rising pawl, and the second inclined face is arranged proximate to the lowering pawl. The cam is driven to rotate by the cam shaft. When the first inclined face is attached to the rising pawl, the rising pawl is matched with the ratchet, so that the bed can be manually lifted; and when the second inclined face is attached to the lowering pawl, the lowering pawl is matched with the ratchet, so that the bed can be manually lowered.

According to the disclosure, the manual switching assembly further includes a knob seat, a manual knob, a compression spring and a contact switch. The knob seat is connected to an outer wall of the transmission box, the manual knob is connected to the knob seat, the compression spring is connected to the cam shaft, both ends of the compression spring are respectively connected to an inner wall of the transmission box and the cam shaft, the contact switch is fixed inside the transmission box, and one end of the cam shaft is connected to the manual knob, and the other end of the cam shaft faces towards the contact switch, which is electrically connected with the controller. The manual switch assembly provides the compression spring on the cam shaft, and when the manual knob is rotated on the knob seat and switched to the manual rising or manual lowering operating positions, it will drive the cam shaft to exit, which will make the cam shaft and the contact switch out of coordination; when the manual knob is rotated and switched to an initial position on the knob seat, the cam shaft and the contact switch cooperate to trigger an electrical signal of the contact switch, so that the controller can receive the signal of the contact switch and determine whether the lifting bed is in a manual mode or not, thus avoiding a false action of an electric operation in the manual mode.

According to the disclosure, a bottom end of the rising pawl is connected to the transmission box, a first ratchet tooth is formed on one side of a top end of the rising pawl, a first spring is provided on the other side of the top end of the rising pawl; a bottom end of the lowering pawl is connected to the transmission box, a second ratchet tooth is formed on one side of a top end of the lowering pawl, and a second spring is arranged on the other side of the top end of the lowering pawl, and the first ratchet tooth and the second ratchet tooth are respectively arranged opposite to the ratchet. The spring functions to make the first ratchet tooth of the rising pawl or the second ratchet tooth of the lowering pawl act on the ratchet stably when it is switched to the manual rising or manual lowering operating position, thus improving reliability of manual locking.

According to the disclosure, a hand extension mechanism is provided outside of the transmission box, a hand rotating hole is provided on a side edge of the frame, one end of the hand extension mechanism is connected with the hand shaft, and the other end of the hand extension mechanism is connected into the hand rotating hole. The manual transmission mechanism is arranged inside the frame, so the hand extension mechanism is provided for connection, which facilitates rising or lowering of the bed.

According to the disclosure, the knob seat is further provided with a V-shaped groove, two ends of the V-shaped groove are respectively provided with a rising locking groove and a lowering locking groove, and the manual knob is provided with a travel block which is disposed opposite to the V-shaped groove and is respectively adapted with the rising locking groove and the lowering locking groove. Rotation of the manual knob on the knob seat makes the travel block rise along the V-shaped groove and be stuck in the rising locking groove or the lowering locking groove, so that the cam shaft can extend and retract.

According to the disclosure, a sprocket transmission assembly is further provided between the motor and the transmission rod, and the sprocket transmission assembly includes a driving sprocket, a driven sprocket and a chain, the driving sprocket is connected to the output shaft of the motor, the driven sprocket is connected to the transmission rod, and the chain is respectively connected with the driving sprocket and the driven sprocket.

According to the disclosure, it further includes a travel limiting mechanism. The travel limiting mechanism includes a limit screw, a screw nut, a first travel switch and a second travel switch; a linkage gear set is connected between the limit screw and the transmission rod, the screw nut is connected to the limit screw; the first travel switch and the second travel switch are respectively arranged at two ends of the limit screw; and the first travel switch and the second travel switch are respectively electrically connected with the controller. A travel limiting mechanism is provided to detect a rotational travel of the transmission rod, so as to control a rising height limit and the lowering height limit of the lifting bed.

According to the disclosure, the transmission rod is further provided with a tape holder, the tape is disposed through the frame, one end of the tape is connected with the tape holder, and the other end of the tape is provided with a tape mounting plate.

The electric lifting bed of the disclosure is provided with an electric mode and a manual mode, and the electric mode and the manual mode are interlocked, and their operations are specifically as follows:

In the electric mode, when an electric rising switch is pressed, the controller drives the brake to release the output shaft of the motor and control the motor to rotate forward, then the transmission rod is driven to rotate by the sprocket transmission assembly, and the tape can be wound on the tape holder with rotation of the transmission rod and the frame rises steadily under guidance of a track guide mechanism; and when it rises to a specified height, the rising switch is released, and the controller drives the brake to hold the output shaft of the motor and control the motor to stop rotating, so as to complete a rising action of the lifting bed; when an electric lowering switch is pressed, the controller drives the brake to release the output shaft of the motor and the lifting bed lowers under gravity itself, the tape is released from the tape holder, and the frame lowers stably under guidance of the track guide mechanism, and when it lowers to a specified height, the lowering switch is released and the controller drives the brake to hold the output shaft of the motor and control the motor to stop rotating, so as to complete an lowering action of the lifting bed.

In the manual mode, when the manual knob is operated to clamp the travel block into the rising locking groove of the knob seat, the cam shaft is withdrawn to make the cam shaft out of contact fit with the contact switch, the controller receives a contact switch signal and enters a manual rising mode, and at the same time, the first inclined face of the cam is attached to the rising pawl, and the first ratchet tooth of the rising pawl is matched with the ratchet under an action of the first spring to prevent the bed from lowering. At this time, the hand extension mechanism can be operated to make the hand shaft rotate clockwise, and the second bevel gear drives the first bevel gear to rotate to make the transmission rod rotate, the tape is wound on the transmission rod to raise the bed manually; and when the manual knob is operated to clamp the travel block into the lowering locking groove of the knob seat, the cam shaft is withdrawn to make the cam shaft out of contact fit with the contact switch, the controller receives an contact switch signal and enters a manual lowering mode, and at the same time, the second inclined face of the cam is attached to the lowering pawl, and the second ratchet tooth of the lowering pawl is matched with the ratchet to prevent the bed from rising. At this time, the hand extension mechanism is operated to rotate the hand shaft counterclockwise, and the second bevel gear drives the first bevel gear to rotate so that the transmission rod rotates, and the tape is released from the transmission rod to lower the bed manually.

With the interlocking of the electric mode and manual modes, matching of the manual knob and the knob seat makes the cam shaft retract with the manual knob when the manual knob rotates to the rising locking groove or lowering locking groove, which makes the cam shaft out of fit with the contact switch, and the signal generated by the contact switch is sent to the controller to make the electric transmission mechanism perform no action, thus realizing interlocking of the electric and manual modes.

The electric transmission mechanism of the electric lifting bed of the present disclosure adopts the brake to realize control of a height of the lifting bed, and it travel straightly up and down during the lifting process, greatly improving operation stability of the electric lifting bed; and by providing the rotary encoder to determine a position of the lifting bed, and the motor feeds back a current signal of the motor to the controller in an operation process, the controller can determine whether the lifting bed is overloaded according to a relationship curve between the signal of the rotary encoder and the current signal of the motor, so as to control the motor to continue to operating or not, and to prevent overloading of the motor from affecting service life of the electric lifting bed.

The electric lifting bed of the disclosure is provided with the manual transmission mechanism, which has a reasonable and ingenious internal structure design and a reliable transmission action, and the contact switch is arranged in the manual switching assembly, so that the controller will not drive the electric transmission mechanism to act when manually rising and manually lowering the operation position, thus realizing switching between the electric and manual modes.

The travel limiting mechanism is further provided in this disclosure to control the travel of the electric lifting bed, so as to prevent the motor from continuously operating beyond a predetermined lifting travel of the electric lifting bed due to a long-term pressing of the lifting switch in operations.

DETAILED DESCRIPTION

In order to further understand contents of the present disclosure, the present disclosure will be described in detail with reference to drawings and examples.

In description of this disclosure, it should be noted that unless otherwise specified and limited, terms "installing", "coupling" and "connecting" should be understood broadly, for example, it can be "fixedly connecting", "integrally connecting", or "detachably connecting"; or it can be "mechanically connecting" or "electrically connecting", or it can be "communicating within two elements"; or it can be "directly connecting" or "indirectly connecting through an intermediate medium", and specific meanings of the above terms can be understood according to specific situations for ordinary shilled in the art.

With reference to FIGS. 1 to 8, an electric lifting bed for an automobile is provided in a technical scheme of the disclosure, which includes a frame 1, a controller 2, a lifting transmission mechanism 3, an electric transmission mechanism 4 and a manual transmission mechanism 5. The lifting transmission mechanism 3 includes a transmission rod 31 and a tape 32, the tape 32 is connected with the transmission rod 31, and the electric transmission mechanism 4 includes an electric lifting switch 41, a motor 42, a brake 43 and an encoder 44. The brake 43 is connected to an output shaft of the motor 42, the encoder 44 is connected to the output shaft of the motor 42, the motor 42 is connected to the transmission rod 31, the electric lifting switch 41, the motor 42, the brake 43 and the encoder 44 are electrically connected to the controller 2 respectively, and the manual transmission mechanism 5 includes a transmission box 51, a manual transmission assembly, a manual locking assembly and a manual switching assembly. The manual transmission assembly further includes a first bevel gear 52, a second bevel gear 53 and a hand shaft 54. The first bevel gear 52 is connected to the transmission rod 31, the hand shaft 54 is connected to the transmission box 51, the second bevel gear 53 is connected to the hand shaft 54, and the first bevel gear 52 is meshed with the second bevel gear 53. The manual locking assembly further includes a ratchet 55, a rising pawl 56, a lowering pawl 57, a cam 58 and a cam shaft 59. The ratchet 55 is connected to the hand shaft 54, the cam shaft 59, the rising pawl 56 and the lowering pawl 57 are respectively connected to the transmission box 51, the cam 58 is connected to the cam shaft 59, the rising pawl 56 and the lowering pawl 57 are respectively oppositely arranged at two sides of the cam 58; and the cam 58 includes a first inclined face 581 and a second inclined face 582, the first inclined face 581 is arranged proximate to the rising pawl 56, and the second inclined face 582 is arranged proximate to the lowering pawl 57. The manual switching assembly further includes a knob seat 510, a manual knob 511, a compression spring 512 and a contact switch 513. The knob seat 510 is connected to an outer wall of the transmission box 51, the manual knob 511 is connected to the knob seat 510, the compression spring 512 is connected to the cam shaft 59, both ends of the compression spring 512 are respectively connected to an inner wall of the transmission box 51 and the cam shaft 59, the contact switch 513 is fixed inside the transmission box 51, and one end of the cam shaft 59 is connected to the manual knob 511, and the other end of the cam shaft 59 faces towards the contact switch 513, which is electrically connected with the controller 2.

In the above embodiment, a convex structure formed on the cam shaft 59 provides an action point for the compression spring 512.

In this embodiment, a bottom end of the rising pawl 56 is connected to the transmission box 51, a first ratchet tooth 561 is formed on one side of a top end of the rising pawl 56, a first spring 562 is provided on the other side of the top end of the rising pawl 56; a bottom end of the lowering pawl 57 is connected to the transmission box 51, a second ratchet tooth 571 is formed on one side of a top end of the lowering pawl 57, and a second spring 572 is arranged on the other side of the top end of the lowering pawl 57, and the first ratchet tooth 561 and the second ratchet tooth 571 are respectively arranged opposite to the ratchet 55.

In this embodiment, a hand extension mechanism 6 is provided outside of the transmission box 51, a hand rotating hole 11 is provided on a side edge of the frame 1, one end of the hand extension mechanism 6 is connected with the hand shaft 54, and the other end of the hand extension mechanism 6 is connected into the hand rotating hole 11. The hand extension mechanism 6 can be a rigid rotating shaft, with universal joints at both ends of the rigid rotating shaft, and the two universal joints are respectively connected with the hand shaft 54 and an external hand handle.

In this embodiment, the knob seat 510 is further provided with a V-shaped groove 5101, two ends of the V-shaped groove 5101 are respectively provided with a rising locking groove 5102 and a lowering locking groove 5103, and the manual knob 511 is provided with a travel block 5111 which is disposed opposite to the V-shaped groove 5101 and is respectively adapted with the rising locking groove 5102 and the lowering locking groove 5103.

In this embodiment, a sprocket transmission assembly 7 is further provided between the motor 42 and the transmission rod 31, and the sprocket transmission assembly 7 includes a driving sprocket 71, a driven sprocket 72 and a chain 73, the driving sprocket 71 is connected to the output shaft of the motor 42, the driven sprocket 72 is connected to the transmission rod 31, and the chain 73 is respectively connected with the driving sprocket 71 and the driven sprocket 72.

In this embodiment, the frame 1 is also provided with a travel limiting mechanism 8. The travel limiting mechanism 8 includes a limit screw 81, a screw nut 82, a first travel switch 83 and a second travel switch 84; a linkage gear set 85 is connected between the limit screw 81 and the transmission rod 31, the screw nut 82 is connected to the limit screw 81; the first travel switch 83 and the second travel switch 84 are respectively arranged at two ends of the limit screw 81; and the first travel switch 83 and the second travel switch 84 are respectively electrically connected with the controller 2.

In this embodiment, the transmission rod 31 is further provided with a tape holder 33, the tape 32 is disposed through the frame 1, one end of the tape 32 is connected with the tape holder 33, and the other end of the tape 32 is provided with a tape mounting plate 34.

In this embodiment, the second bevel gear 53 and the ratchet 55 are fixed to the hand shaft 54 by a snap spring.

In this embodiment, the encoder 44 is a rotary encoder.

In the above embodiment, the frame 1 is also provided with a guide rail for assisting stable lifting of the bed.

Figure 1:
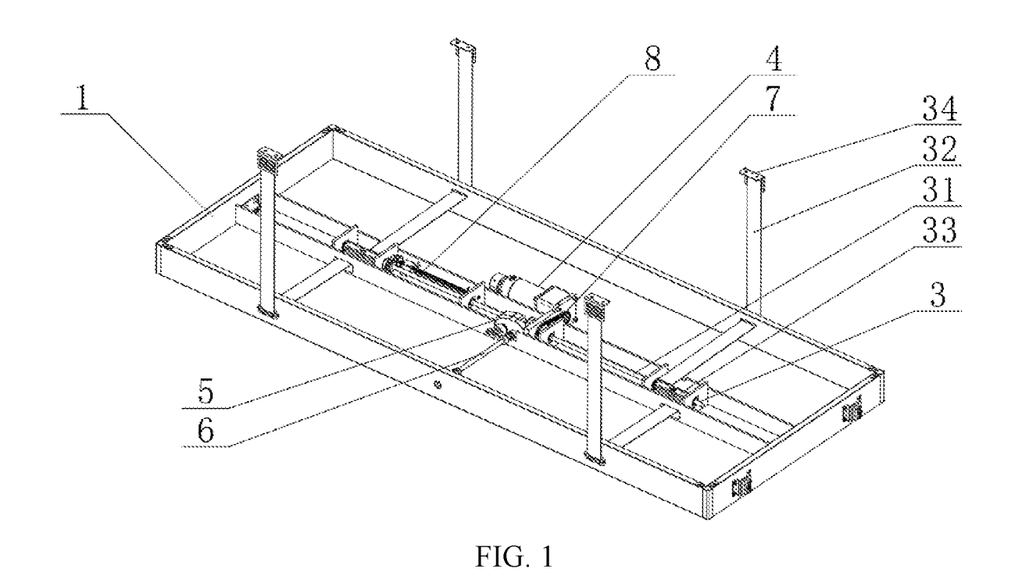
FIG. 1 is a perspective view of an embodiment of the present disclosure.
Figure 2:
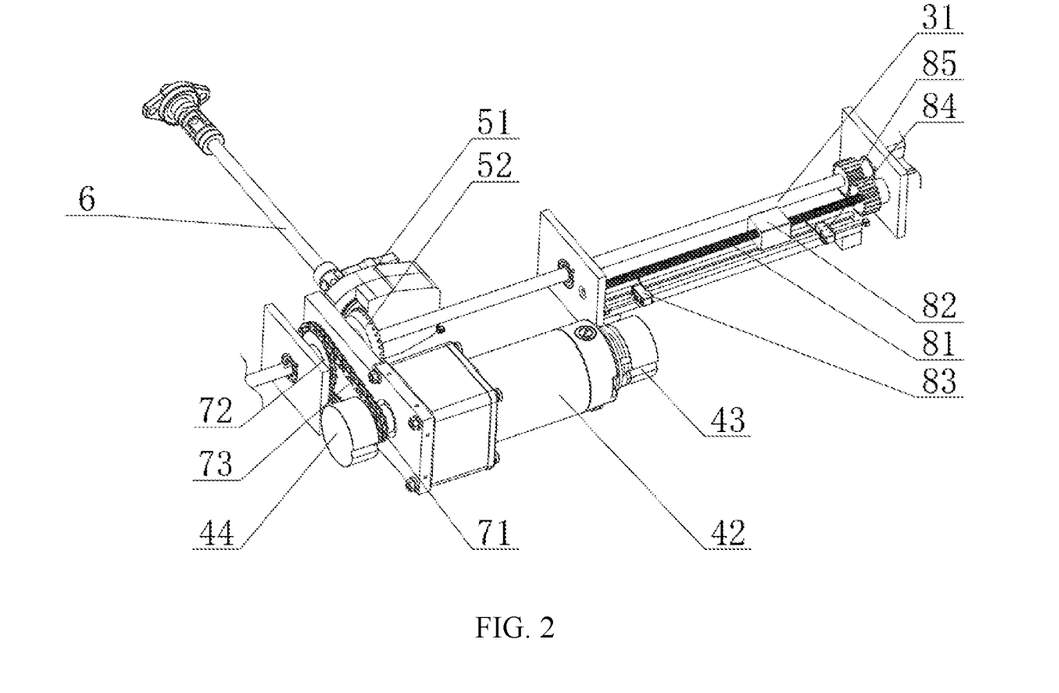
FIG. 2 is a partial perspective view of an embodiment of the present disclosure.
Figure 3:
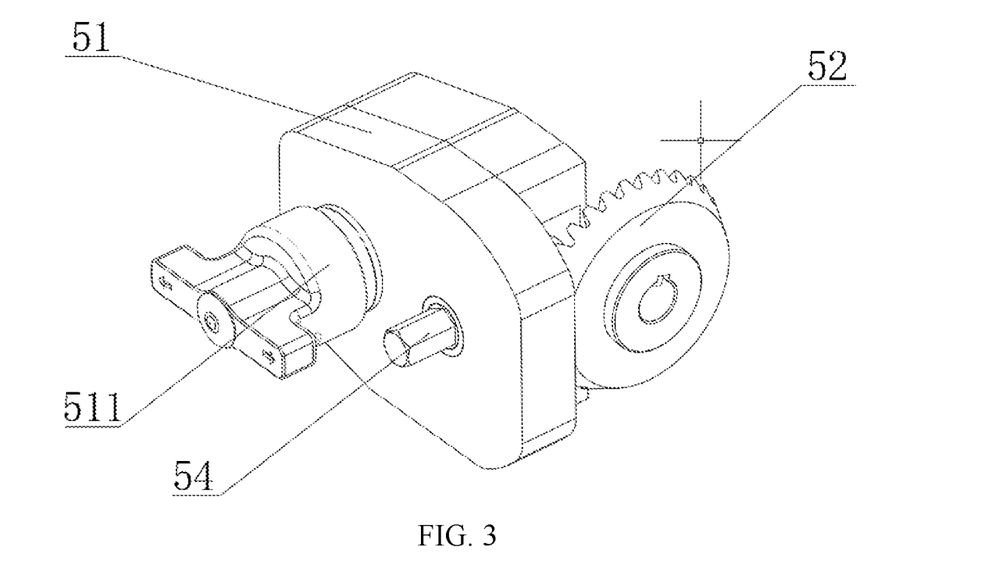
FIG. 3 is a perspective view of a manual transmission mechanism according to an embodiment of the present disclosure.
Figure 4:
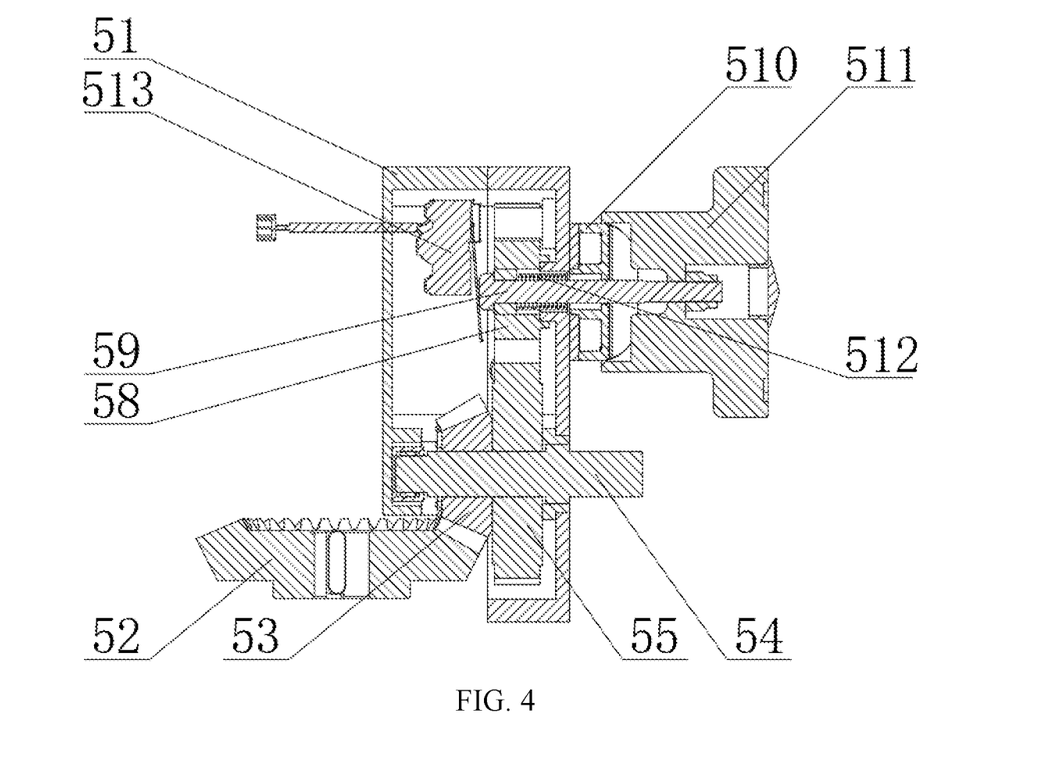
FIG. 4 is a sectional view of a manual transmission mechanism according to an embodiment of the present disclosure.
Figure 5:
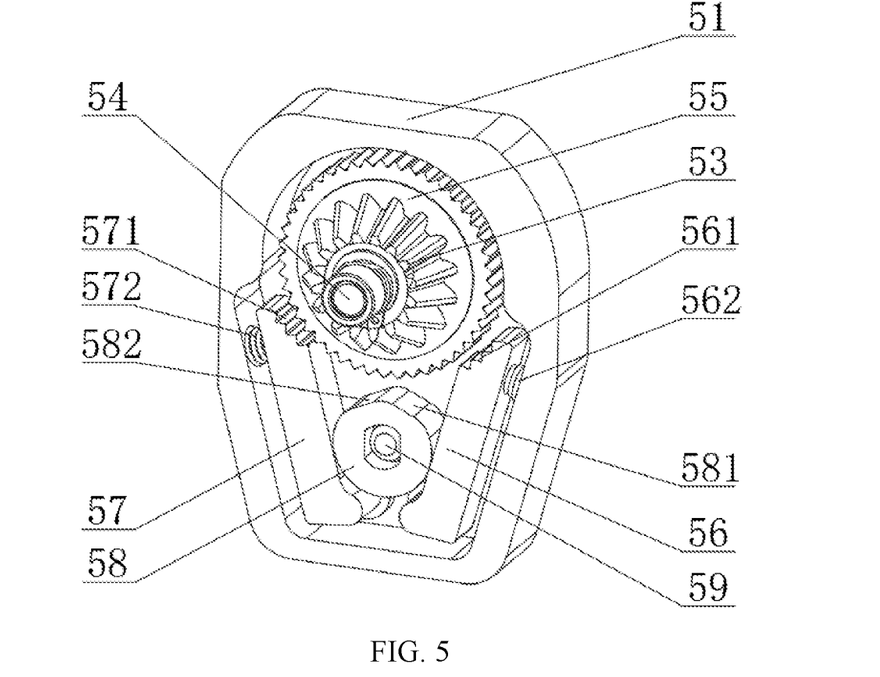
FIG. 5 is a perspective view of the manual transmission mechanism of the embodiment of the present disclosure with the transmission box being opened.
Figure 6:
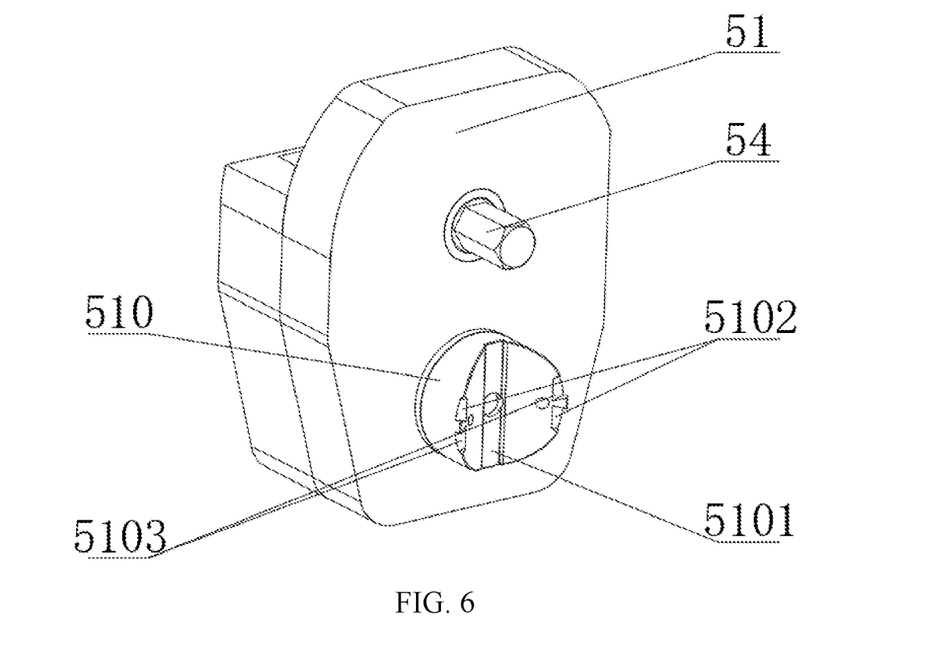
FIG. 6 is a perspective view of the manual transmission mechanism of the embodiment of the present disclosure with the manual knob being removed.
Figure 7:
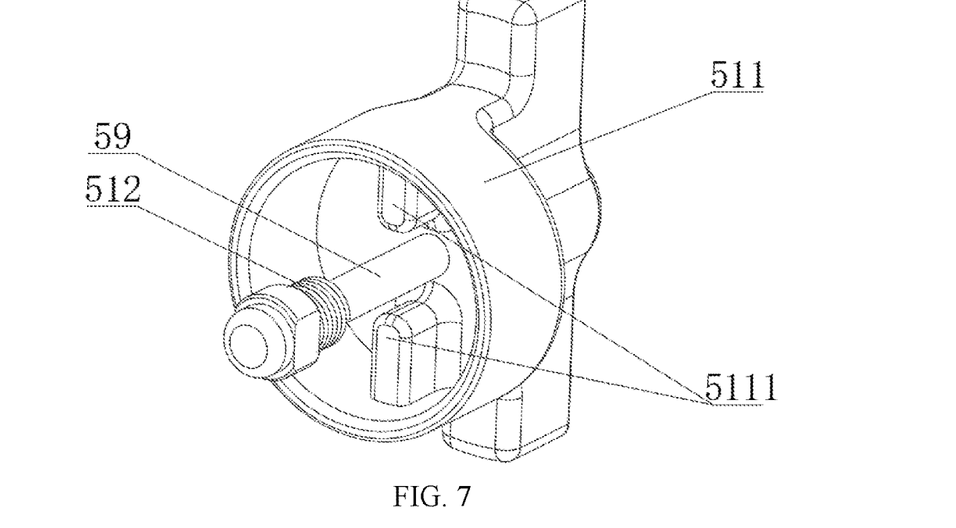
FIG. 7 is a perspective view of a manual knob according to an embodiment of the present disclosure.
Figure 8:
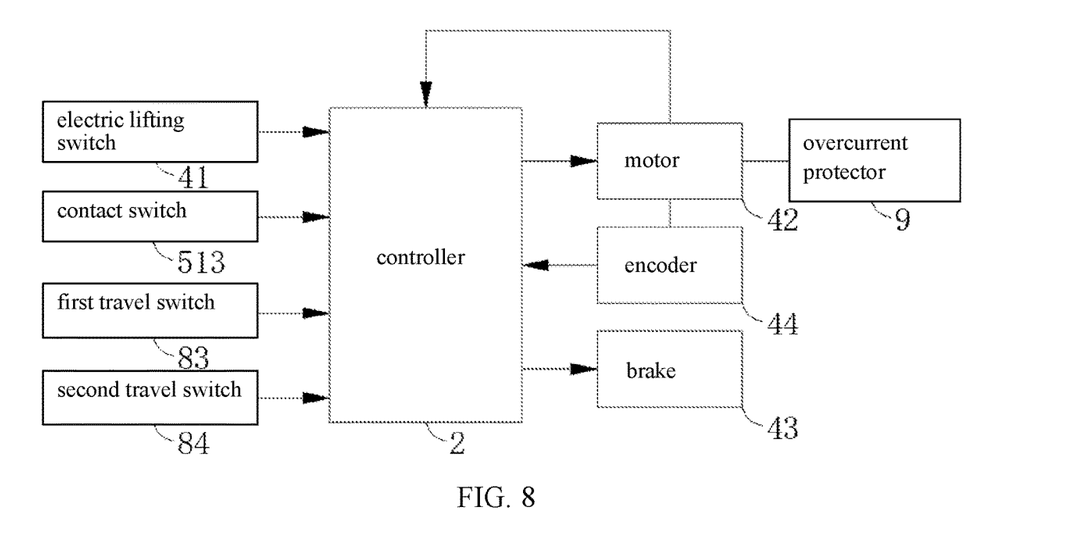
FIG. 8 is a block diagram of a hand electric control according to an embodiment of the present disclosure.

As shown in FIG. 8, the electric lifting switch 41, the contact switch 513, the first travel switch 83, the second travel switch 84 and the output of the encoder 44 are respectively connected to an input of the controller 2. An output of the controller 2 is connected with an input of the motor 42 and an input of the brake 43 respectively. A current output signal of the motor 42 is connected to the input of the controller 2 to realize current sampling of the motor. The motor 42 is also provided with an overcurrent protector 9.

According to the above embodiment, a specific operating mode of the electric lifting bed according to the technical scheme of the disclosure is as follows:

In the electric mode, when an electric rising switch is pressed, the controller drives the brake to release the output shaft of the motor and control the motor to rotate forward, then the transmission rod is driven to rotate by the sprocket transmission assembly, and the tape can be wound on the tape holder with rotation of the transmission rod and the frame rises steadily under guidance of a track guide mechanism; and when it rises to a specified height, the rising switch is released, and the controller drives the brake to hold the output shaft of the motor and control the motor to stop rotating, so as to complete a rising action of the lifting bed; when an electric lowering switch is pressed, the controller drives the brake to release the output shaft of the motor and the lifting bed lowers under gravity itself, the tape is released from the tape holder, and the frame lowers stably under guidance of the track guide mechanism, and when it lowers to a specified height, the lowering switch is released and the controller drives the brake to hold the output shaft of the motor and control the motor to stop rotating, so as to complete an lowering action of the lifting bed.

In the manual mode, when the manual knob is operated to clamp the travel block into the rising locking groove of the knob seat, the cam shaft is withdrawn to make the cam shaft out of contact fit with the contact switch, the controller receives a contact switch signal and enters a manual rising mode, and at the same time, the first inclined face of the cam is attached to the rising pawl, and the first ratchet tooth of the rising pawl is matched with the ratchet under an action of the first spring to prevent the bed from lowering. At this time, the hand extension mechanism can be operated to make the hand shaft rotate clockwise, and the second bevel gear drives the first bevel gear to rotate to make the transmission rod rotate, the tape is wound on the transmission rod to raise the bed manually; and when the manual knob is operated to clamp the travel block into the lowering locking groove of the knob seat, the cam shaft is withdrawn to make the cam shaft out of contact fit with the contact switch, the controller receives an contact switch signal and enters a manual lowering mode, and at the same time, the second inclined face of the cam is attached to the lowering pawl, and the second ratchet tooth of the lowering pawl is matched with the ratchet to prevent the bed from rising. At this time, the hand extension mechanism is operated to rotate the hand shaft counterclockwise, and the second bevel gear drives the first bevel gear to rotate so that the transmission rod rotates, and the tape is released from the transmission rod to lower the bed manually.

With the interlocking of the electric mode and manual modes, matching of the manual knob and the knob seat makes the cam shaft retract with the manual knob when the manual knob rotates to the rising locking groove or lowering locking groove, which makes the cam shaft out of fit with the contact switch, and the signal generated by the contact switch is sent to the controller to make the electric transmission mechanism perform no action, thus realizing interlocking of the electric and manual modes.

When a circuit of the electric lifting bed is subjected to power loss, the brake can be manually released from the motor, so as to operate the lifting bed in the manual mode.

In another embodiment, the contact switch 513 can also be respectively arranged on sides of the rising pawl 56 and the lowering pawl 57, and the contact switch 513 can also be configured to monitor whether to enter the manual mode.

In another embodiment, the encoder 44 is connected to the transmission rod 31.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skilled in the art inspired by this disclosure without creativity, without departing from the creative purpose of the present disclosure, are all within a protection scope of the present disclosure.

What is claimed is:

1. An electric lifting bed for an automobile, comprising:
   a frame,
   a controller,
   a lifting transmission mechanism,
   an electric transmission mechanism, and
   a manual transmission mechanism;
   wherein the lifting transmission mechanism comprises a transmission rod and a tape, the tape being connected with the transmission rod;
   wherein the electric transmission mechanism comprises an electric lifting switch, a motor, a brake and an encoder, the brake being connected to an output shaft of the motor, the encoder being connected to the output shaft of the motor or the transmission rod, the motor being connected with the transmission rod, the electric lifting switch, the motor, the brake and the encoder being electrically connected with the controller respectively;
   wherein the manual transmission mechanism comprises a transmission box, a manual transmission assembly, a manual locking assembly and a manual switching assembly, wherein the manual transmission assembly comprises a hand shaft, the hand shaft being connected to the transmission box, the hand shaft being drive-connected with the transmission rod,
   wherein the manual locking assembly further comprises a ratchet, a rising pawl, a lowering pawl, a cam and a cam shaft, the ratchet being connected to the hand shaft, the cam shaft, the rising pawl and the lowering pawl being respectively connected to the transmission box, the cam being connected to the cam shaft, the rising pawl and the lowering pawl being respectively oppositely arranged at two sides of the cam;

wherein the manual switching assembly further comprises a knob seat, a manual knob, a compression spring and a contact switch, the knob seat being connected to an outer wall of the transmission box, the manual knob being connected to the knob seat, the contact switch being fixed inside the transmission box, the contact switch being electrically connected with the controller, one end of the cam shaft being connected to the manual knob, wherein the contact switch cooperates with the cam shaft to form a linkage, or the contact switch cooperates with the rising pawl and the lowering pawl to form a linkage respectively.

2. The electric lifting bed for the automobile according to claim 1, wherein the manual transmission assembly further comprises a first bevel gear and a second bevel gear, the first bevel gear being connected to the transmission rod, the second bevel gear being connected to the hand shaft, and the first bevel gear being meshed with the second bevel gear.

3. The electric lifting bed for the automobile according to claim 2, wherein the cam comprises a first inclined face and a second inclined face, the first inclined face being arranged proximate to the rising pawl, and the second inclined face being arranged proximate to the lowering pawl.

4. The electric lifting bed for the automobile according to claim 3, wherein the manual switching assembly further comprises a compression spring, the compression spring being connected to the cam shaft, both ends of the compression spring being respectively connected to an inner wall of the transmission box and the cam shaft, and the other end of the cam shaft facing towards the contact switch.

5. The electric lifting bed for the automobile according to claim 3, wherein a bottom end of the rising pawl is connected to the transmission box, a first ratchet tooth is formed on one side of a top end of the rising pawl, a first spring is provided on the other side of the top end of the rising pawl; a bottom end of the lowering pawl is connected to the transmission box, a second ratchet tooth is formed on one side of a top end of the lowering pawl, and a second spring is arranged on the other side of the top end of the lowering pawl, and the first ratchet tooth and the second ratchet tooth are respectively arranged opposite to the ratchet.

6. The electric lifting bed for the automobile according to claim 2, wherein a hand extension mechanism is provided outside of the transmission box, a hand rotating hole is provided on a side edge of the frame, one end of the hand extension mechanism is connected with the hand shaft, and the other end of the hand extension mechanism is connected into the hand rotating hole.

7. The electric lifting bed for the automobile according to claim 4, wherein the knob seat is further provided with a V-shaped groove, two ends of the V-shaped groove being respectively provided with a rising locking groove and a lowering locking groove, and the manual knob is provided with a travel block which is disposed opposite to the V-shaped groove and is respectively adapted with the rising locking groove and the lowering locking groove.

8. The electric lifting bed for the automobile according to claim 1, wherein a sprocket transmission assembly is further provided between the motor and the transmission rod, and the sprocket transmission assembly comprises a driving sprocket, a driven sprocket and a chain, the driving sprocket being connected to the output shaft of the motor, the driven sprocket being connected to the transmission rod, and the chain being respectively connected with the driving sprocket and the driven sprocket.

9. The electric lifting bed for the automobile according to claim 1, further comprising a travel limiting mechanism, wherein the travel limiting mechanism comprises a limit screw, a screw nut, a first travel switch and a second travel switch, a linkage gear set being connected between the limit screw and the transmission rod, the screw nut being connected to the limit screw, the first travel switch and the second travel switch being respectively arranged at two ends of the limit screw, and the first travel switch and the second travel switch being respectively electrically connected with the controller.

10. The electric lifting bed for the automobile according to claim 1, wherein the transmission rod is further provided with a tape holder, the tape being disposed through the frame, one end of the tape being connected with the tape holder, and the other end of the tape being provided with a tape mounting plate.

11. The electric lifting bed for the automobile according to claim 2, wherein a sprocket transmission assembly is further provided between the motor and the transmission rod, and the sprocket transmission assembly comprises a driving sprocket, a driven sprocket and a chain, the driving sprocket being connected to the output shaft of the motor, the driven sprocket being connected to the transmission rod, and the chain being respectively connected with the driving sprocket and the driven sprocket.

12. The electric lifting bed for the automobile according to claim 2, further comprising a travel limiting mechanism, wherein the travel limiting mechanism comprises a limit screw, a screw nut, a first travel switch and a second travel switch, a linkage gear set being connected between the limit screw and the transmission rod, the screw nut being connected to the limit screw, the first travel switch and the second travel switch being respectively arranged at two ends of the limit screw, and the first travel switch and the second travel switch being respectively electrically connected with the controller.

13. The electric lifting bed for the automobile according to claim 2, wherein the transmission rod is further provided with a tape holder, the tape being disposed through the frame, one end of the tape being connected with the tape holder, and the other end of the tape being provided with a tape mounting plate.

14. The electric lifting bed for the automobile according to claim 3, wherein a sprocket transmission assembly is further provided between the motor and the transmission rod, and the sprocket transmission assembly comprises a driving sprocket, a driven sprocket and a chain, the driving sprocket being connected to the output shaft of the motor, the driven sprocket being connected to the transmission rod, and the chain being respectively connected with the driving sprocket and the driven sprocket.

15. The electric lifting bed for the automobile according to claim 3, further comprising a travel limiting mechanism, wherein the travel limiting mechanism comprises a limit screw, a screw nut, a first travel switch and a second travel switch, a linkage gear set being connected between the limit screw and the transmission rod, the screw nut being connected to the limit screw, the first travel switch and the second travel switch being respectively arranged at two ends of the limit screw, and the first travel switch and the second travel switch being respectively electrically connected with the controller.

16. The electric lifting bed for the automobile according to claim 3, wherein the transmission rod is further provided with a tape holder, the tape being disposed through the frame, one end of the tape being connected with the tape holder, and the other end of the tape being provided with a tape mounting plate.

17. The electric lifting bed for the automobile according to claim 4, wherein a sprocket transmission assembly is further provided between the motor and the transmission rod, and the sprocket transmission assembly comprises a driving sprocket, a driven sprocket and a chain, the driving sprocket being connected to the output shaft of the motor, the driven sprocket being connected to the transmission rod, and the chain being respectively connected with the driving sprocket and the driven sprocket.

18. The electric lifting bed for the automobile according to claim 4, further comprising a travel limiting mechanism, wherein the travel limiting mechanism comprises a limit screw, a screw nut, a first travel switch and a second travel switch, a linkage gear set being connected between the limit screw and the transmission rod, the screw nut being connected to the limit screw, the first travel switch and the second travel switch being respectively arranged at two ends of the limit screw, and the first travel switch and the second travel switch being respectively electrically connected with the controller.

19. The electric lifting bed for the automobile according to claim 4, wherein the transmission rod is further provided with a tape holder, the tape being disposed through the frame, one end of the tape being connected with the tape holder, and the other end of the tape being provided with a tape mounting plate.

20. The electric lifting bed for the automobile according to claim 7, wherein the transmission rod is further provided with a tape holder, the tape being disposed through the frame, one end of the tape being connected with the tape holder, and the other end of the tape being provided with a tape mounting plate.

\* \* \* \* \*